Figure 1:
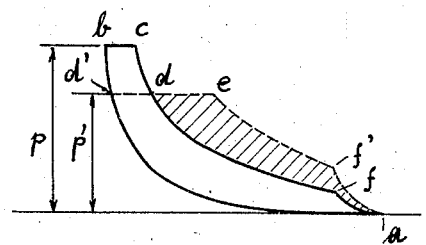

Sept. 9, 1930.  R. HILDEBRAND  1,775,490
VALVE AND VALVE MOTION
Filed Aug. 30, 1926   2 Sheets-Sheet 1

INVENTOR:
Reinhard Hildebrand

Sept. 9, 1930.　　R. HILDEBRAND　　1,775,490
VALVE AND VALVE MOTION
Filed Aug. 30, 1926　　2 Sheets-Sheet 2

INVENTOR,
Reinhard Hildebrand.

Patented Sept. 9, 1930

1,775,490

UNITED STATES PATENT OFFICE

REINHARD HILDEBRAND, OF WEBSTER GROVES, MISSOURI

VALVE AND VALVE MOTION

Application filed August 30, 1926. Serial No. 132,501.

These improvements apply, mainly, to admitting an auxiliary power fluid into the working cylinder of an engine, particularly an internal combustion engine, so as to increase the mean effective pressure exerted on the piston of said cylinder, as described in my Patent No. 1,761,561, June 3, 1930.

In an engine of the kind above referred to, the auxiliary power fluid is admitted during the expansion stroke when the gases within the working cylinder have reached a pressure which equals that of the said power fluid. This will be more fully understood by referring to the drawings.

Figure 2:
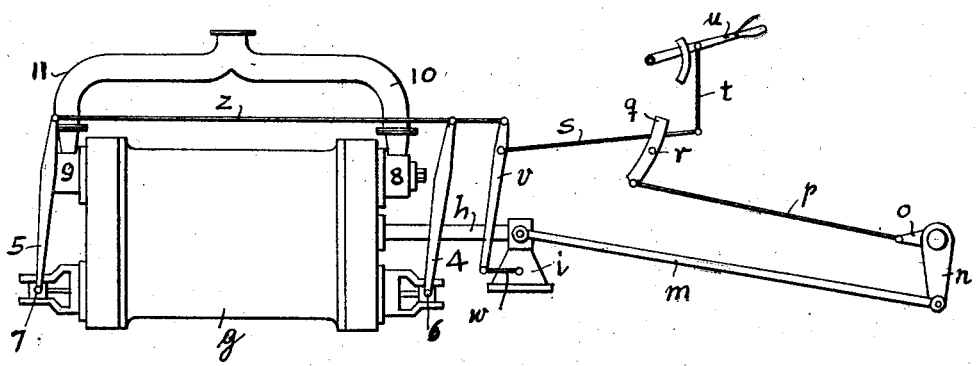
Figure 4:
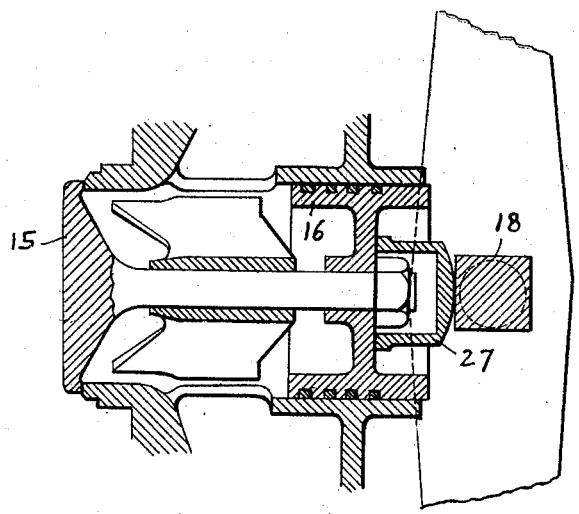
Figure 3:
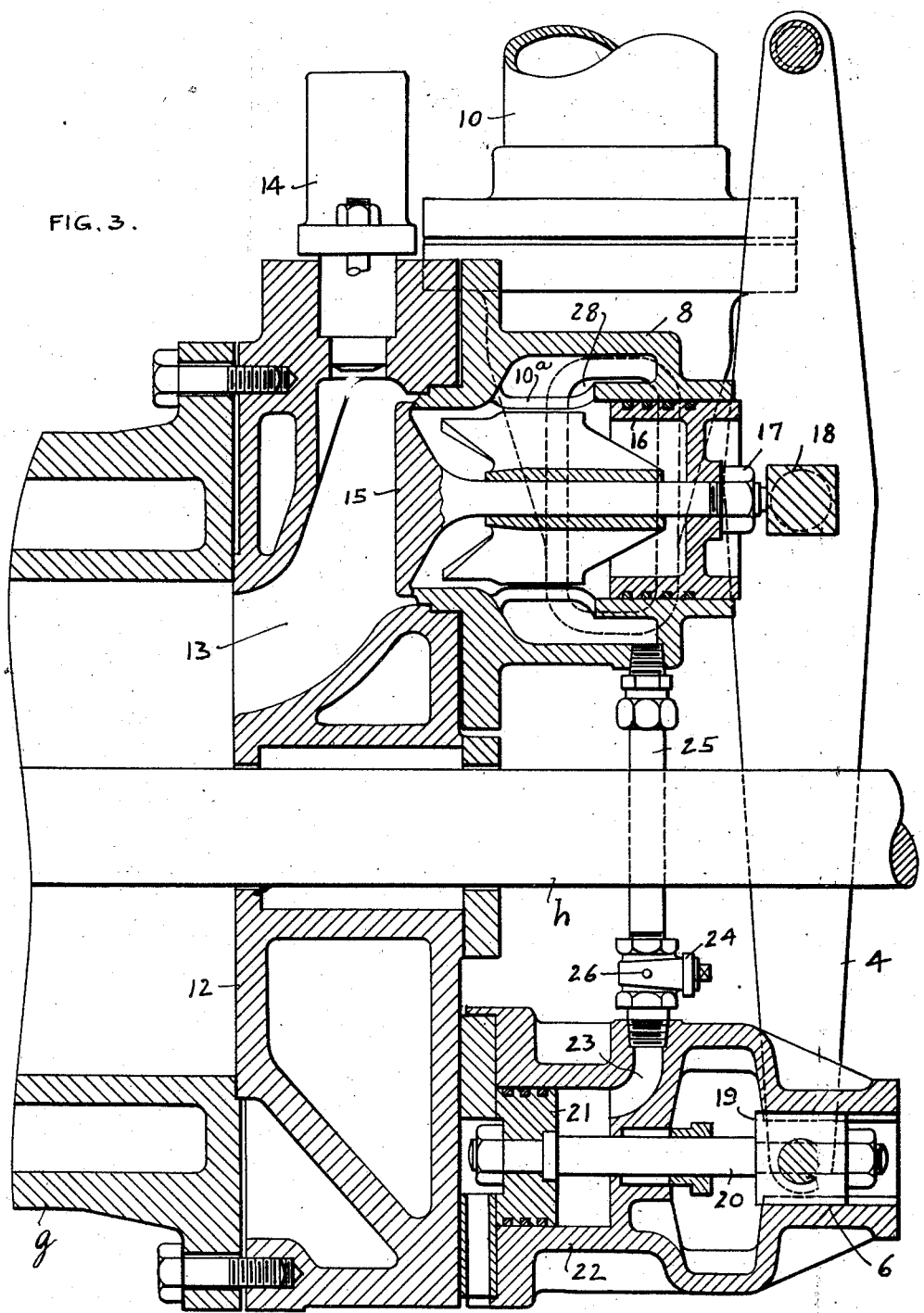

Figure 1 is an indicator card, obtained with my valve gear, Figure 2 illustrates diagrammatically an engine with valve gear, Figure 3 is a partial cross section through the working cylinder with inlet valve and part of my valve gear, Figure 4 shows an alteration of Figure 3.

Referring to Figure 1: The line $a-b$ represents the compression stroke and the line $b-c-f-a$ the expansion stroke of an internal combustion engine working according to the well-known Diesel cycle. In order to increase the mean piston pressure, compressed air, steam, or some other power fluid under pressure, (called auxiliary power fluid hereafter) may be admitted into the working cylinder during the expansion stroke. Not to overstrain the engine, it is advisable to use an auxiliary power fluid of a pressure $p'$ not higher than $p$, which represents the maximum pressure for which the engine is designed and built. However, the pressure of the auxiliary power fluid may be equal or a little lower than the maximum pressure. Furthermore, it will be found convenient to open the valve which admits the auxiliary power fluid (called the inlet valve hereafter) at $d$ when the gases in the cylinder are expanded from the pressure $p$ to the pressure $p'$. The auxiliary power fluid being admitted from $d$ to $e$ mix and expand with the products of the combustion. At the point $f'$ the exhaust begins. The shaded area indicates the gain in power due to the auxiliary power fluid.

It will be found more convenient to open the inlet valve in the manner described, i. e. when the gases in the working cylinder have reached the pressure $p'$, than when the inlet valve opens at a fixed "lead". This will be understood when it is realized that the expansion line of the gases $c-f-a$ may lay more towards the right or more towards the left, depending on the length of the combustion line $b-c$, that is, depending on the quantity of fuel burned. Thus, changing the length of the combustion line, the point $d$ will shift, either towards the right, or towards the left. The point $d$ will even shift approximately to the point $d'$ during starting, when there is no combustion, for then the point $c$ falls on the point $b$ and the expansion line falls on, or slightly below, the compression line. Therefore, the point at which the inlet valve opens should not be fixed but the valve should open whenever the gases in the working cylinder have reached approximately the pressure of the auxiliary power fluid.

The ordinary valve gears used nowadays in connection with engines are designed for approximately constant lead. Thus, they are not adapted to open the inlet valve in accordance with the pressure in the working cylinder unless a vital change in the design of these valve gears is made. One of the objects of this invention is to provide a valve gear which opens the inlet valve at a predetermined pressure inside of the working cylinder.

Now referring to Figure 2, which shows an engine of a locomotive using the well known Walschaerts valve gear, somewhat modified embodying my invention. $g$ is the working cylinder whose piston is operated by a primary power medium supplied to said cylinder, $h$ the piston rod, $i$ the cross head, $m$ the connecting rod, $n$ the crank, $o$ the eccentric, $p$ the eccentric rod, $q$ the link, $r$ the pivot of the link, $s$ the reach rod having a length equal to the curvature of the link. $t$ is the shifting rod which is held in position by the reversing lever $u$. The reach rod transmits its motion to the lever $v$, which also receives a motion from the cross head by means of rod $w$. The lever $v$ being suspended at its upper end by the rod $z$, transmits its motion to the rocker arms 4 and 5 by means of rod $z$. These rocker arms are fulcrumed at 6 and 7 in a yielding manner, hereafter more fully described. The rocker arms actuate the inlet valves of which the housing shown is marked 8 and 9. The auxiliary power fluid is transmitted by the pipes 10 and 11.

Referring to Figure 3: The cylinder head 12 forms the combustion chamber 13, which accommodates the fuel valve 14 and the inlet valve 15. The piston 16 is attached to the inlet valve stem by nut 17. The auxiliary power fluid, entering the valve by pipe 10, and openings $10^a$ and 28, acts upon the valve 15 and piston 16. Since the area of the piston 16 is larger than the one of the valve 15, the auxiliary power fluid always tends to close the inlet valve and to keep it tight on its seat.

The rocker arm 4, straddling the piston rod $h$, acts upon the inlet valve by means of the member 18. The fulcrum 6 of the rocker arm is forged integral with the slide block 19 to which the piston rod 20 with piston 21 is secured. This piston being housed in the body 22 is acted upon by the auxiliary power fluid entering through port 23, stop cock 24, pipe 25, and valve housing 8.

The operation of the inlet valve and valve gear is as follows: When the engine is running, the valve gear moves the rocker arms 4 and 5 back and forth in a similar manner as it moves the slide valve in an ordinary steam locomotive. This opens and closes the inlet valves in proper sequence. These valves would open at a predetermined lead if the fulcrums 6 and 7 would be rigid. This, however, is not the case. On the contrary, these fulcrums can and do yield when the valve gear tries to open the inlet valve while the pressure in the working cylinder, acting upon the outside of the inlet valve, is higher than the pressure of the auxiliary power fluid. Figure 3 will make this clear if we assume that the rocker arm 4 is moved by the valve gear toward the left hand around the fulcrum 6 while the pressure in the working cylinder is above the pressure of the auxiliary power fluid. In this case, the force required to open the valve 15 is so great, that the reaction of the fulcrum 6 exceeds the force exerted by the piston 21, causing the fulcrum to yield until the pressure in the working cylinder and behind the inlet valve is low enough for the inlet valve to open. This valve will then open quickly, due to the movement of the valve gear and the return movement of the fulcrum piston 21.

The described valve gear thus opens the inlet valve when a certain predetermined pressure in the working cylinder is reached. Depending on the size of the fulcrum piston 21 this pressure may be equal, above, or below the pressure of the power fluid. When closing the cock 24, which brings the port 23 in communication with the vent hole 26, the pressure on the piston 21 is released causing the fulcrum 6 to yield and the inlet valve to remain closed. In this case, no auxiliary power medium will be admitted to the working cylinder and the engine will work as an internal combustion engine without an additional power fluid.

Shifting the reversing lever $u$, Figure 2, the reach rod $s$ will be raised or lowered and thus the cut-off of the inlet valve changed. Shifting the slide block of the reach rod $s$ to the other side of the pivot of the link the motion of the engine will be reversed.

A mechanism of the construction above described for admitting an auxiliary power medium to the cylinder of an internal combustion engine so as to increase the mean effective pressure exerted on the piston of said cylinder, is of simple design, it is reliable in operation and it can be adjusted easily to cut off the supply of the auxiliary power medium to the cylinder by simply turning the cock 24 so as to vent the cylinder 22 in which the piston 21 moves, or, in other words, establish communication between said cylinder and the atmosphere. After the mechanism has been adjusted in this way, the rocker arms 4 and 5 will oscillate or rock upon the members 18 when the actuating means for said rocker arms is in operation, and accordingly, the inlet valves 15 will remain seated and no auxiliary power medium or fluid will be admitted to the cylinder $g$. A change in the position of the cock 24, however, establishes communication between the pipe 25 and the cylinder 22 in which the piston 21 moves, thereby causing the auxiliary power medium supplied by the pipe 10 to be exerted on the piston 21 in a direction tending to hold said piston at rest at the left hand end of the cylinder 22 in which it operates. Thereafter, when the rocker arm 4 is subjected to a thrust from its actuating mechanism, in a direction tending to move the upper end of said rocker arm to the left (looking at Figure 3), the piston 21 will shift bodily to the right, if the pressure which exists in the cylinder $g$ at this time is in excess of the pressure of the auxiliary power medium, due, of course, to the fact that the internal pressure in the cylinder $g$ holds the inlet valve 15 seated. However, as soon as the maximum pressure in the cylinder $g$ is reached, the inlet valve 15 opens quickly, due to the pressure exerted on same by the rocker arm 4 which at this time is subjected to two forces, both of which are exerted on said rocker arm in a direction tending to open the valve 15, i. e., the force that is exerted on the upper end of said rocker arm by its actuating mechanism, and the force that is exerted on the lower end of said rocker arm by the pressure which the auxiliary power medium exerts on the piston 21. The result is that the inlet valve 15 will be held tightly against its seat so long as the pressure in the cylinder $g$ is in excess of the maximum pressure, and said valve will open quickly as soon as the maximum pressure in said cylinder is reached, thereby causing the auxiliary power fluid or medium to be admitted to the cylinder $g$.

While I prefer to construct the operating mechanism for the inlet valve 15 in the manner above described, I wish it to be understood that said operating mechanism can be constructed in various other ways without departing from the spirit of my invention, as my broad idea consists of an inlet valve for admitting an auxiliary power medium to a working cylinder, a mechanically-operated actuating mechanism for said valve, and a yielding means or member forming part of said actuating mechanism or combined with same in such a way as to permit or cause the inlet valve to remain seated when the pressure in the working cylinder is in excess of an approximate degree and to open quickly as soon as the pressure in the working cylinder reaches a certain ratio with the pressure of the auxiliary power medium or fluid which said valve admits to the cylinder. Accordingly, in Figure 4 of the drawings I have illustrated another embodiment of my invention, wherein a fixed or unyielding fulcrum is provided for the lower end of the rocker arm 4, and a yielding member 27 is interposed between the piston 16 and the member 18 on the rocker arm 4. In this form of my invention the piston 16 is mounted on the stem of the valve 15 in such a way that it is capable of moving towards and away from a nut on said stem that serves as an abutment against which the piston 16 is held by the pressure of the auxiliary power medium, and the member 27 is constructed in the form of a spacer or hollow cap piece proportioned so that the pressure exerted on the upper end of the rocker arm 4 by its actuating mechanism when the pressure in the cylinder $g$ is in excess of the maximum pressure, will cause the member 18 on the rocker arm 4 to exert a thrust on the spacer 27 in a direction to cause the piston 16 to yield or move slightly to the left (looking at Figure 4) away from the stop on the stem of the valve 15. As soon as the internal pressure of the cylinder $g$ reaches a certain ratio with the pressure of the auxiliary power fluid, the valve 15 will open and admit the auxiliary power fluid to the cylinder. In the form of my invention shown in Figure 4 the inlet valve 15 is restored to its seat and held seated by the pressure of the auxiliary power fluid on the piston 16 which is of greater area than the surface of the valve 15 on which the auxiliary power fluid acts.

What I claim is:

1. The combination of a cylinder in which pressure is created by a primary power medium, an inlet valve for admitting an auxiliary power medium to said cylinder, a means combined with said valve and adapted to be acted upon by said auxiliary power medium for holding said valve seated, a mechanically-operated actuating mechanism for opening said valve comprising a rocker arm, and a fulcrum for said rocker arm arranged so that it will shift sufficiently to prevent said rocker arm from causing said valve to open, until a certain ratio is established between the pressure in said cylinder and the pressure of said auxiliary power medium.

2. The combination of a cylinder in which pressure is created by a primary power medium, an inlet valve for admitting an auxiliary power medium to said cylinder, a means combined with said valve and adapted to be acted upon by said auxiliary power medium for holding said valve seated, a mechanically-operated actuating mechanism for opening said valve comprising a rocker arm, a shiftable fulcrum for said rocker arm, and a member acted upon by said auxiliary power medium that tends to hold said fulcrum in a certain position, permits it to move sufficiently to prevent said valve from opening until a certain ratio is established between the pressure in the cylinder and the pressure of said auxiliary power medium and thereafter restores said fulcrum to its former position.

3. A means for admitting an auxiliary power medium to a working cylinder, comprising an inlet valve, a member combined with said valve and adapted to be acted upon by said auxiliary power medium for exerting pressure on said valve in a direction tending to hold it seated, a mechanically operated rocker arm for opening said valve, a shiftable fulcrum for said arm, and a piston combined with said fulcrum and arranged so that it is normally held in one position in its cylinder by the pressure exerted on same by said auxiliary power medium.

4. A means for admitting an auxiliary power medium to a working cylinder, comprising an inlet valve, a member combined with said valve and adapted to be acted upon by said auxiliary power medium for exerting pressure on said valve in a direction tending to hold it seated, a mechanically operated rocker arm for opening said valve, a shiftable fulcrum for said arm, a piston combined with said fulcrum and arranged so that it is normally held in one position in its cylinder by the pressure exerted on same by said auxiliary power medium, and means for cutting off the auxiliary power medium from the cylinder of said piston and for venting said cylinder.

5. In an engine provided with a working cylinder, a valve for admitting an auxiliary power medium to said cylinder, a mechanism for operating said valve comprising a lever, and a yielding fulcrum for said lever for governing the time of opening said valve.

6. The combination of a cylinder adapted to have pressure created in same by a primary power medium, an inlet valve for admitting an auxiliary power medium to said cylinder, a mechanically-operated actuating mechanism for opening said valve, and a means that co-acts with said actuating mechanism to hold said valve closed until a certain ratio is established between the pressure in said cylinder and the pressure of said auxiliary power medium.

7. The combination of a cylinder adapted to have pressure created in same by a primary power medium, an inlet valve for admitting an auxiliary power medium to said cylinder, a piston combined with said valve and adapted to be acted upon by said auxiliary power medium to hold said valve seated, a mechanically operated actuating mechanism for opening said valve, and a yielding means that co-acts with said actuating mechanism to maintain said valve in its closed position until a certain ratio is established between the pressure in the cylinder and the pressure of said auxiliary power medium.

8. The combination of a cylinder adapted to have pressure created in same by a primary power medium, an inlet valve for admitting an auxiliary power medium to said cylinder, a mechanically-operated actuating mechanism for opening said valve, a yielding member acted upon by said auxiliary power medium and co-acting with said actuating mechanism to hold said valve closed until a certain ratio is established between the pressure in the cylinder and the pressure of said auxiliary power medium, and an adjustable means for controlling the action of said yielding member.

9. The combination of a cylinder adapted to have pressure created in same by a primary power medium, an inlet valve for admitting an auxiliary power medium to said cylinder, said inlet valve being arranged so that said auxiliary power medium constantly exerts pressure on said inlet valve in a direction tending to open the same, a means adapted to be acted upon by said auxiliary power medium for holding said inlet valve closed, a mechanically-operated actuating mechanism for opening said valve, and a yielding member acted upon by said auxiliary power medium and co-acting with said actuating mechanism to hold said valve closed when said actuating mechanism is in operation, until a certain ratio is established between the pressure in said cylinder and the pressure of said auxiliary power medium.

10. The combination of a cylinder adapted to have pressure created in same by a primary power medium, an inlet valve for admitting an auxiliary power medium to said cylinder, a piston attached to said valve and arranged so that said auxiliary power medium exerts pressure on said piston in a direction tending to hold said valve seated, a mechanically-operated actuating means for opening said valve comprising a rocker arm, and a yielding member adapted to be acted upon by said auxiliary power medium and co-acting with said rocker arm to hold said valve closed while the pressure in said cylinder is in excess of a certain degree and to thereafter exert pressure on said rocker arm in a direction to assist in unseating said valve.

11. A means for admitting an auxiliary power medium to a working cylinder, comprising a valve, a mechanically-operated actuating mechanism for opening said valve, and a yielding means adapted to be acted upon by said auxiliary power medium and co-acting with said actuating mechanism to hold said valve closed under the conditions described.

12. A means for admitting an auxiliary power medium to a working cylinder, comprising an inlet valve, a mechanically-operated actuating mechanism for opening said valve, and a means adapted to be acted upon by said auxiliary power medium and co-acting with said actuating mechanism to hold said valve closed under the conditions described and to thereafter assist said mechanism to unseat said valve.

13. In an engine provided with a working cylinder, a valve for admitting an auxiliary power medium to said cylinder, a mechanically-operated actuating mechanism for said valve, and a yielding means that co-acts with said actuating mechanism to hold said valve closed, and to determine the time of opening said valve.

14. In an engine provided with a working cylinder, a valve for admitting an auxiliary power medium to said cylinder, and a mechanically-operated actuating mechanism for operating said valve provided with a part that is adapted to yield and thus cause the valve to remain in its closed condition until a certain approximate ratio is established between the pressure in the cylinder and the pressure of the auxiliary power medium being admitted to the cylinder.

REINHARD HILDEBRAND.